Aug. 11, 1925.
P. P. ADDIS
1,549,176
THERMOMETER
Filed July 30, 1921
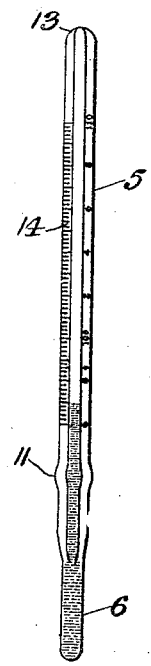
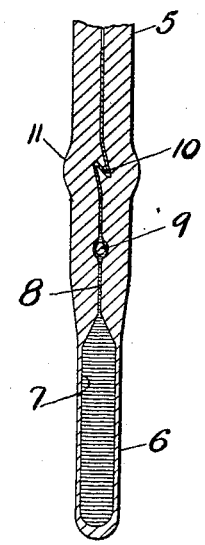
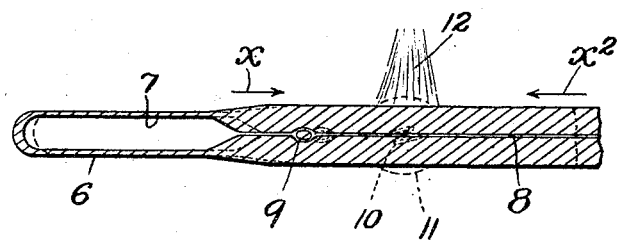
Inventor
Paul P. Addis
By his Attorneys
Edgar Tate &Co.

Patented Aug. 11, 1925.

1,549,176

UNITED STATES PATENT OFFICE.

PAUL P. ADDIS, OF BROOKLYN, NEW YORK.

THERMOMETER.

Application filed July 30, 1921. Serial No. 488,552.

*To all whom it may concern:*

Be it known that I, PAUL P. ADDIS, a citizen of the United States, and residing at Brooklyn, in the county of Kings and State of New York, have invented certain new and useful Improvements in Thermometers, of which the following is a specification, such as will enable those skilled in the art to which it appertains to make and use the same.

This invention relates to thermometers and particularly to clinical and mercurial thermometers such as used by physicians, nurses and others, and the object of the invention is to provide a thermometer of the class specified which is so constructed as to prevent the retreating of the mercury or the fluctuations thereof when in practical use, and which by reason of its construction will also facilitate the shaking down of the mercury as is the usual practice; and with this and other objects in view the invention consists in a thermometer of the class and for the purpose specified which is simple in construction and operation, efficient in use and which is constructed in accordance with the hereinafter described method.

The invention is fully disclosed in the following specification, of which the accompanying drawing forms a part, in which the separate parts of my improvement are designated by suitable reference characters in each of the views, and in which:—

Fig. 1 is a plan view of my improved thermometer;

Fig. 2 an enlarged sectional detail view of one end portion of the thermometer shown in Fig. 1; and, Fig. 3 a sectional detail view of that part of the thermometer shown in Fig. 2 and indicating the method of forming a predetermined portion of the thermometer.

In Fig. 1 of the drawing I have shown at 5 a thermometer of the clinical and mercurial type, such as is commonly used by physicians and others, and said thermometer is provided at one end with a mercury bulb 6 formed by reducing the end portion of the body of the device and providing a comparatively large mercury chamber 7 therein, the body of the device is also provided with a comparatively small bore 8 which communicates with the chamber 7 and passes longitudinally and centrally through the body of the thermometer.

The thermometer, or body portion thereof, is provided at a predetermined distance above the chamber 7 with a contraction chamber 9 formed in the usual manner but, in practice, I preferably increase the area of said chamber to a slight extent to avoid the usual friction in the contraction chambers of thermometers of this class, which friction tends to retard the flow of the mercury in the thermometer and this is done by compressing the side wall, or walls thereof to a less extent than they are usually compressed. Aside from the above mentioned change in the contraction chamber, the thermometer is constructed in the same manner as similar devices or articles of this class now upon the market and in accordance with the methods of producing the same.

In the practice of my invention I provide the bore 8 of the thermometer at a predetermined distance above the contraction chamber 9 with a hook-shaped and downwardly directed offset portion 10, and the body portion of the thermometer about or around the hook-shaped offset portion 10 which forms a substantially Z-shaped passage is enlarged as shown at 11. In the manufacture of the thermometer and particularly in the formation of the hook-shaped offset portion 10 in the bore 8 thereof, that part of the body portion of the thermometer which is to be provided with the hook-shaped offset portion 10 in the bore 8 thereof is heated to the desired extent by a suitable flame 12, and the thermometer is rotated by hand in said flame, and when properly heated or when heated to the desired extent, the opposite end portions of the thermometer are moved toward each other longitudinally thereof, as indicated by the arrows $x$ and $x^2$ of Fig. 3, to a slight extent which operation forms the bulged or enlarged portion 11 from the body portion of the thermometer and also the hook-shaped offset portion 10 of the bore 8.

It will be apparent that the bulb 6, bore 8, and contraction chamber 9 are all formed in the body portion of the thermometer prior to the formation of the hook-shaped offset portion 10 of the bore 8, and after said hook-shaped portion has been formed in the manner above set out, the thermometer, or the bore 8 thereof is sealed by closing the end portion 13 in the usual manner, and the usual degree scale 14 is also fixed or engraved on the periphery of the body portion of the thermometer.

A thermometer made in accordance with my invention or provided with a hook-shaped offset portion in the bore thereof will, as will be apparent, tend to hold the mercury in the proper position in the bore in the use of the thermometer, or in the operation of reading the temperature of a party. In other words, my improved thermometer will prevent the retarding of the mercury in reading registrations thereof, and will also eliminate the fluctuations of the mercury in the practical use of the thermometer, and by reason of the formation of the contraction chamber, the thermometer will be sensitive in operation and will permit of the taking of temperatures in much less time than heretofore, with thermometers that are now upon the market and in general use.

It will be apparent that I am not necessarily limited to the specific form of the offset portion 10 of the bore of the thermometer nor to the specific location thereof herein shown and described, and various changes in and modifications of the construction herein set out may be made, within the scope of the appended claims, without departing from the spirit of my invention or sacrificing its advantages.

Having fully described my invention, what I claim as new and desire to secure by Letters Patent, is:—

1. A thermometer of the class described comprising a body portion of substantially the same dimensions throughout and having at what normally is its lower end, a mercury chamber, the bore of said body extending longitudinally thereof and being in communication with said chamber, said bore being offset adjacent said chamber, the offset portion extending laterally and downwardly, then laterally and upwardly and then downwardly and inwardly, said offset portion controlling the movement of mercury through said bore.

2. A thermometer of the class described comprising a body portion of substantially the same dimensions throughout and having at what normally is its lower end, a mercury chamber, the bore of said body extending longitudinally thereof and being in communication with said chamber, said bore being offset adjacent said chamber, the offset portion extending laterally and downwardly, then laterally and upwardly and then downwardly and inwardly, said offset portion controlling the movement of mercury through said bore, and a contraction chamber between the offset portion of the bore and said chamber.

In testimony that I claim the foregoing as my invention I have signed my name in presence of the subscribing witnesses this 28th day of July 1921.

PAUL P. ADDIS.

Witnesses:
C. E. MULREANY,
H. E. THOMPSON.